US006451722B1

(12) United States Patent
Kim

(10) Patent No.: US 6,451,722 B1
(45) Date of Patent: Sep. 17, 2002

(54) METHOD FOR MANUFACTURING ARTIFICIAL REEF BASED ON INDUSTRIAL WASTE

(76) Inventor: Ho Sung Kim, Dongsanwonrum Apt. 102-905, 414 Nongseong-dong, Seo-ku, Kwangju Metropolitan City, 502-200 (KR)

( * ) Notice: Subject to any disclaimer, the term of this patent is extended or adjusted under 35 U.S.C. 154(b) by 0 days.

(21) Appl. No.: 09/509,086

(22) PCT Filed: Jul. 26, 1999

(86) PCT No.: PCT/KR99/00406

§ 371 (c)(1),
(2), (4) Date: Mar. 22, 2000

(87) PCT Pub. No.: WO00/06314

PCT Pub. Date: Feb. 10, 2000

(30) Foreign Application Priority Data

Jul. 28, 1998 (KR) ............................................ 98-30370

(51) Int. Cl.$^7$ ........................ A01K 61/00; C04B 33/00; B28B 1/00
(52) U.S. Cl. ....................... 501/155; 501/141; 119/207; 119/221; 264/211.11; 264/645; 264/653; 264/679; 264/680
(58) Field of Search ............................... 501/141, 155; 119/207, 221; 264/211.11, 148, 638, 645, 653, 679, 680

(56) References Cited

U.S. PATENT DOCUMENTS

| 3,879,211 A | * | 4/1975 | Klotz ........................ 501/155 |
| 3,886,244 A | * | 5/1975 | Bayer et al. .................. 264/44 |
| 3,886,245 A | * | 5/1975 | Bayer et al. ................. 501/155 |
| 4,844,015 A | * | 7/1989 | Garvey et al. ................. 119/4 |
| 5,106,797 A | * | 4/1992 | Allaire ....................... 501/155 |
| 5,199,377 A | * | 4/1993 | Gehrmann, III et al. ........ 119/4 |

FOREIGN PATENT DOCUMENTS

| JP | 4850982 | * | 7/1973 |
| JP | 7250587 | * | 10/1995 |

* cited by examiner

Primary Examiner—Michael Marcheschi
(74) Attorney, Agent, or Firm—Armstrong, Westerman & Hattori, LLP

(57) ABSTRACT

A method for manufacturing an artificial reef based on industrial waste is disclosed. Industrial wastes, including red mud, blast furnace slag, the sludges from the factories of refining raw ore, broken pieces of glass, the stone powders from the anti-pollution facilities equipped in stone- or aggregate-extracting spots, the slurries from the terminal treatment plants of water and sewage, the ashes from the incinerators for household wastes, the pulp sludges and slurries from paper mills, the coal ashes from thermoelectric power plants, and the side-products produced upon coal mining, are utilized, alone or in combination with a plasticizer and a mineralizer, in constructing artificial fishing reeves through pug-milling, molding and thermal treatment processes. The artificial fishing reef, through which the industrial wastes are converted into environment-affinitive resources, have advantages of being economically favorable and producing no pollution of the environment.

12 Claims, No Drawings

METHOD FOR MANUFACTURING ARTIFICIAL REEF BASED ON INDUSTRIAL WASTE

TECHNICAL FIELD

The present invention relates, in general, to a method for manufacturing an artificial fishing reef based on an industrial waste which is effective to protect and bring up marine resources, and more particularly, to a method for manufacturing an artificial fishing reef based on an industrial waste which is not contaminated the water quality and the submarine soil by mechanically and chemically stabilizing under the water and is environment-affinitive, endurable and economically favorable.

BACKGROUND ART

The marine resources along the coast, particularly, the fish resources have tendency to be drained owing to overfishing and the pollution of the coastal sea. In order to protect and rear the fish resources along the coast, various efforts have been made. Artificial reeves resulted from one of such efforts. Almost all of the artificial fishing reeves which are constructed are single mold gradients made of steel concrete. Because of being heavy and large, such concrete fishing reeves are very difficult to transport to the working spot. For this reason, concrete fishing reeves are restricted in their construction places. In fact, concrete fishing reeves are constructed near the sea spots to which they are to be threw. Further, concrete fishing reeves suffer from disadvantages in that they are dissolved in sea water to contaminate the water and submarine soil in addition to having a short lifespan. Furthermore, concrete fishing reeves are disadvantages in cost, and intensive care must be taken when carrying and handling them.

As an alternative, steel-assembled fishing reeves were developed in expectation of overcoming a part of the disadvantages that the concrete fishing reeves have. The steel-assembled fishing reeves, however, are easily rusted by sea water or fresh water, contaminating the water and the submarine soil or river soil. Further, they are very expensive.

With the development of the heavy chemical industry, a great quantity of by-products or wastes are generated. There are no perfectly suitable disposal methods of the by-products and wastes. Generally, they are disposed by burial in land. However, this disposal method suffer from disadvantages of polluting the soil and subterranean water and being high in cost. Compared with the total amount of the by-products or the wastes, their rejuvenation stays in a poor level.

DISCLOSURE OF THE INVENTION

With this background in mind, it is therefore an object of the present invention to overcome the problems encountered in prior arts and to provide an artificial fishing reef which is based on industrial wastes.

It is another object of the present invention to provide an artificial fishing reef which is economically favorable and gets industrial wastes to be an environment-affinitive resource.

It is a further object of the present invention to provide an artificial fishing reef which is so mechanically and chemically stable that it is free of the contamination of the water and the sea soil.

It is still a further object of the present invention to provide a method for manufacturing such artificial fishing reeves.

In accordance with an aspect of the present invention, there is provided an industrial waste-based artificial reef, which comprises 50~100 % by weight of an industrial waste, 0~50% by weight of a sub-gradient, 0~15% by weight of a plasticizer, and 0~5% by weight of a mineralizer.

In accordance with another aspect of the present invention, there is provided a method for manufacturing an industrial waste-based artificial reef, in which a composition comprising 50~100% by weight of an industrial waste, 0~50% by weight of a sub-gradient, 0~15% by weight of a plasticizer, and 0~5% by weight of a mineralizer is subjected to pug-milling with the aid of a pug mill, molded under pressure, dried or calcined at a temperature of 700~1,000° C., and sintered at 1,000~1,300° C. for 10~30 hours.

The industrial wastes are selected from red mud, which is typically produced when alumina is refined from bauxite, blast furnace slag, the sludges from the factories of refining raw ore, broken pieces of glass, the stone powders from the anti-pollution facilities equipped in stone- or aggregate-extracting spots, the slurries from the terminal treatment plants of water and sewage, the ashes from the incinerators for household wastes, the pulp sludges and slurries from paper mills, the coal ashes from thermoelectric power plants, and the side-products produced upon coal mining.

The material which undergoes the sintering process are of structural and chemical stability as well as of no reactivity with sea water, so the artificial fishing reeves made of the material produce no pollution of the environment and have a long lifespan.

DETAILED DESCRIPTION OF THE INVENTION

In the present invention, various industrial wastes or by-products can be used as materials for artificial fishing reeves. Examples of the industrial wastes useful in the present invention include red mud, which is typically produced when alumina is refined from bauxite, blast furnace slag, the sludges from the factories of refining raw ore, broken pieces of glass, the stone powders from the anti-pollution facilities equipped in stone- or aggregate-extracting spots, the slurries from the terminal treatment plants of water and sewage, the ashes from the incinerators for household wastes, the pulp sludges and slurries from paper mills, the coal ashes from thermoelectric power plants, and the side-products produced upon coal mining.

These wastes are, alone or in combination, molded into desirable forms under pressure with the aid of a pug mill or a molding flask suitable for producing large-sized products. Then, the molded materials are dried or calcined. Upon calcination, the temperature preferably ranges from 700 to 1,000° C. Thereafter, the resulting material is sintered at a temperature of 1,000 to 1,300° C. for 10~30 hours. These numerical ranges are set to reduce the production cost and attain high strength.

Red mud, which is a by-product in a manufacturing process of aluminum hydroxide, is produced at an amount of hundreds of thousands tons each year in Korea. This industrial waste shows a high pH value upon production and a whitening phenomenon after sintering. However, the sintering reduces the pH value to approximately neutral values and the whitening phenomenon is not important because the reeves are submerged under sea water.

In order to improve the physical and mechanical properties of the materials for the artificial fishing reeves of the present invention, sub-gradients and/or additives may be used. In this case, the industrial wastes are a main gradient and are used at an amount of 50~100% by weight on the basis of the total weight of the material for the artificial fishing reeves of the present invention.

The sub-gradients suitable for this purpose may be selected from the industrial wastes or by-products described above. Therefore, the present invention contributes to the solution of the environmental pollution attributed to industrial wastes. The sub-materials are preferably used at an amount of 0~50% by weight based on the total weight of the final material for the artificial fishing reeves of the present invention.

The additives useful in the present invention are those which function to enhance plasticity or sintering properties of the material. Examples of the additives suitable for these purposes include clay and limestone. Clay, serving as a plasticizer in the present invention is added at an amount of 0~15% by weight based on the total weight of the material for the artificial fishing reeves. As for limestone, it plays a role as a mineralizer and added at an amount of 0~5% by weight.

The following Table shows the ingredients and their compositions used in the present invention.

TABLE 1

| Kinds | Components | | | |
|---|---|---|---|---|
| | Main Gradient | Sub Gradient | Plasticizer | Mineralizer |
| Red Mud | 50~100% | 10~25% | 10~25% | 3~5% |
| Blast furnace slug | 30~50% | 10~25% | 15~20% | 3~5% |
| Sludge from ore refinery | 50~80% | 10~20% | 10~15% | 3~5% |
| Broken pieces Glass | 10~30% | 30~50% | 10~25% | 3~5% |
| Stone powder | 50~80% | 10~25% | 10~15% | 3~5% |
| Sewage slurry | 30~40% | 30~50% | 10~15% | 3~5% |
| Incinerator Ash | 30~50% | 20~30% | 10~15% | 3~5% |
| Pulp Sludge | 30~50% | 20~30% | 10~20% | 3~5% |
| Coal Ash | 30~50% | 20~30% | 10~25% | 3~5% |
| Side-product upon coal mining | 50~80% | 10~25% | 10~15% | 3~5% |

INDUSTRIAL APPLICABILITY

As described hereinbefore, the present invention utilizes the industrial wastes which have not been effectively disposed or reclaimed, including red mud, blast furnace slag, the sludges from the factories of refining raw ore, broken pieces of glass, the stone powders from the anti-pollution facilities equipped in stone- or aggregate-extracting spots, the slurries from the terminal treatment plants of water and sewage, the ashes from the incinerators for household wastes, the pulp sludges and slurries from paper mills, the coal ashes from thermoelectric power plants, and the side-products produced upon coal mining, in constructing artificial fishing reeves through pug-milling, molding and thermal treatment processes. The artificial fishing reeves of the present invention, through which the industrial wastes are converted into environment-affinitive resources, have advantages over conventional concrete or steel artificial fishing reeves in that they are economically favorable and produce no pollution of the environment.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An artificial reef, which comprises 50 to 100% by weight of a main gradient which is an industrial waste, greater than 0% and up to 50% by weight of a sub-gradient, greater than 0% and up to 15% by weight of a plasticizer, and greater than 0% and up to 5% by weight of a mineralizer.

2. An artificial reef as set forth in claim 1, wherein the main gradient is at least one selected from the group consisting of red mud, blast furnace slag, sludges from raw ore-refining factories, broken pieces of glass, stone powders from the anti-pollution facilities of stone- or aggregate-extracting spots, slurries from the terminal treatment plants of water and sewage, ashes from incinerators for household wastes, pulp sludges and slurries from paper mills, and coal ashes from thermoelectric power plants.

3. A method for manufacturing an artificial reef, in which a composition comprising 50 to 100% by weight of a main gradient which is an industrial waste, greater than 0% and up to 50% by weight of a sub-gradient, greater than 0% and up to 15% by weight of a plasticizer, and greater than 0% and up to 5% by weight of a mineralizer is subjected to pug-milling with the aid of a pug mill, molded under pressure, dried or calcined at a temperature of 700 to 1,000° C., and sintered at 1,000 to 1,300° C. for 10 to 30 hours.

4. A method for manufacturing an artificial reef as set forth in claim 3, wherein the main gradient is at least one selected from the group consisting of red mud, blast furnace slag, sludges from raw ore-refining factories, broken pieces of glass, stone powders from the anti-pollution facilities of stone- or aggregate-extracting spots, slurries from the terminal treatment plants of water and sewage, ashes from incinerators for household wastes, pulp sludges and slurries from paper mills, and coal ashes from thermoelectric power plants.

5. The artificial reef of claim 2, wherein said sub-gradient is selected from the group consisting of red mud, blast furnace slag, sludges from raw ore-refining factories, broken pieces of glass, stone powders from the anti-pollution facilities of stone- or aggregate-extracting spots, slurries from the terminal treatment plants of water and sewage, ashes from incinerators for household wastes, pulp sludges and slurries from paper mills, and coal ashes from thermoelectric power plants.

6. The artificial reef of claim 1, said main gradient being red mud.

7. The artificial reef of claim 1, said plasticizer being clay.

8. The artificial reef of claim 1, said mineralizer being limestone.

9. The method of claim 4, wherein said sub-gradient is selected from the group consisting of red mud, blast furnace slag, sludges from raw ore-refining factories, broken pieces of glass, stone powders from the anti-pollution facilities of stone- or aggregate-extracting spots, slurries from the terminal treatment plants of water and sewage, ashes from incinerators for household wastes, pulp sludges and slurries from paper mills, and coal ashes from thermoelectric power plants.

10. The method of claim 3, said main gradient being red mud.

11. The method of claim 3, said plasticizer being clay.

12. The method of claim 3, said mineralizer being limestone.

* * * * *